United States Patent [19]
Di Settembrini

[11] 3,778,213
[45] Dec. 11, 1973

[54] APPARATUS FOR MASS PRODUCING HOLLOW OBJECTS

[76] Inventor: Antoine Di Settembrini, 4 Avenue Alfred de Vigny, F-95, Soisy-sous-Montmorency, France

[22] Filed: Apr. 6, 1972

[21] Appl. No.: 241,644

[52] U.S. Cl....... 425/326 B, 264/98, 425/DIG. 209, 425/DIG. 211, 425/342
[51] Int. Cl............................................. B29d 23/03
[58] Field of Search....... 425/342, 326 B, DIG. 209, 425/DIG. 211; 264/94, 98

[56] References Cited
UNITED STATES PATENTS
2,901,769   9/1959   Sherman et al............. 425/342 UX
3,496,600   2/1970   Heston....................... 425/DIG. 205

Primary Examiner—H. A. Kilby, Jr.
Attorney—Myron Cohen et al.

[57] ABSTRACT

An apparatus for mass producing hollow objects, such as bottles, wherein the objects are formed from molds which are moved along a predetermined path and are injected with a hot plastically deformable material, such as plastic, at a first station along said path. Gas is thereafter blown into the mold thereby forming a hollow object therein. When the object in each mold cools down enough so that it may be removed without self-deformation, it is so removed at a second station along the path. The object is then held apart from, and preferably in tracking relation with, the mold wherein it is further cooled to a lower finishing temperature as the mold continues to move along its path. The object is then released at a third station along said path. By removing each object from a mold before it has cooled to said finishing temperature, such object may be cooled faster and the mold may be refilled more frequently during each operation thereby increasing the output of hollow objects.

12 Claims, 15 Drawing Figures

APPARATUS FOR MASS PRODUCING HOLLOW OBJECTS

BACKGROUND OF THE INVENTION

1. Field of the Invention

This invention relates to the manufacture of hollow objects, such as plastic bottles. More specifically, this invention relates to an improved method and apparatus for mass producing hollow objects.

2. Description of the Prior Art

Methods for mass producing hollow objects are known in the art. Typically, one or more molds are employed into which a material to be cast is injected. In the art of manufacturing plastic bottles, for example, a heated plastic extrusion is injected into the mold. Compressed gas, such as air, is then blown into the mold to conform the shape of the plastic to the 0mold thereby forming a hollowed plastic bottle. The bottle is left in the mold until it has finally cooled down to a state in which there is substantially no plastic deformation at which time the mold is opened and the bottle removed. Only then may the mold be re-injected with another heated plastic extrusion to repeat the process.

The above method places an unduly restrictive limit on the quantity of bottles that may possibly be cast from a single mold each day. More specifically, the maximum number of bottles capable of being produced is directly proportional to the time it takes to cool each object down to its final finishing temperature at which point the bottles are substantially non-plastically deformable. It would be desirable if the maximum output of each mold in a hollow object mass producing system could be increased beyond that defined by the cooling time of each object cast in the mold. It would further be desirable if the cooling time of each object could be decreased.

Known devices for performing the above-referenced prior art method not only have limited production outputs, but also require an unfavorably large amount of space which thereby renders such devices uneconomic and inefficient. It would thus be desirable if a maximum output could be achieved in a hollow object producing device having relatively small space requirements.

SUMMARY OF THE INVENTION

This invention relates to a method for mass producing hollow objects wherein the quantitative output of objects from each mold is increased significantly over that achieved by the prior art. A higher quantity output is attained by removing the objects from the molds before they are cooled to a substantially non-plastically deformable state, but yet are cooled sufficiently to maintain a stable shape when removed. Then, as the molds are moved along a closed path to a station for injection of new material, the removed objects track such molds along said path for a distance sufficient to enable complete cooling of said objects to said non-plastically deformable state. By removing the objects from the molds before they are finally cooled, not only is the cooling process hastened, but, further, each mold may be immediately refilled or at least refilled before the removed object is finally cooled and is released.

This invention also relates to an apparatus which achieves a high production output rate of hollow objects in a space saving environment. Preferably, the apparatus is used to mass produce plastic bottles and includes plurality of molds mounted in spaced relation on the surface of a turntable, which molds are caused to move along a predetermined path as the turntable is rotated about its axis. A plastic extruder head is positioned above the turntable at an extruder station along said path for injecting a heated plastic extrusion into each mold as it passes beneath the station. Each mold on the turntable is associated with a bottle removing device which preferably tracks the mold along said path After the plastic has been blown into a bottle form, the bottle is allowed to cool as the mold continues along said path. When the temperature of the bottle is low enough so that the bottle can maintain its shape and yet is still hotter than its finishing temperature, i.e. is still plastically deformable, the mold is opened and the device removes the bottle.

The device is preferably mounted to an assembly which then positions the device, and the removed bottle, in spaced apart relation with the mold so that the bottle will continue to track the mold along said path as it now rapidly cools upon complete exposure to the ambient environment and, further, so that the mold may be re-injected with another plastic extrusion upon returning to said extruder station. In this manner, each mold may be filled with plastic at least once more during the cooling cycle of the first bottle blown, which cooling cycle is substantially less in time than in the prior art. The result is a greatly increased rate of bottle production.

In a preferred embodiment of the above apparatus, a pair of adjacent turntables are employed having a plurality of molds on each wherein the tables preferably rotate in opposite directions with cooled bottles from the molds of each table being released at a common location between the turntables. Preferably a conveyor is located at said common location for transporting the released cooled bottles to a subsequent processing station. Such arrangement greatly reduces the required space to achieve maximum production output.

This invention is also directed to a device for collecting bottles released from an apparatus of this invention and for depositing such bottles onto a conveyer or the like for transportation of such bottles to a further processing station.

These and other aspects and advantages of this invention are more clearly defined below with reference to the accompanying drawing.

DESCRIPTION OF THE PREFERRED EMBODIMENTS

Referring to FIGS. 1-6, one embodiment of an apparatus for mass producing hollow objects in accordance with this invention is shown. More specifically, a manufacturing plant 10 is shown which is preferably employed to mass produce hollow bottles of a material which is substantially non-plastically deformable at room temperature and plastically deformable at elevated temperatures. Examples of such materials are glass and plastic. Plastic is preferred since it is unbreakable and becomes malleable at a much lower temperature than glass.

Plant 10 includes a pair of juxtaposed turntables 12 and 14 which are preferably of identical circular configuration and are preferably located an identical distance above a support surface 21 of a common frame 23. Each turntable is rotatably mounted about a shaft which is fixed to support surface 21 by a conventional mounting assembly. Turntable 12 is preferably rotatable clockwise about a shaft 24 and turntable 14 is preferably rotatable counterclockwise about a shaft 26.

Although the above described rotational movements of turntables 12 and 14 are preferred, it should be noted that the reverse may be true or that both tables may be rotated in the same direction. It is preferred, regardless of which direction of rotation is selected, that the tables be spaced apart relative to each other sufficiently to enable a conventional conveyer belt assembly 28, or like bottle transporting assembly, to be disposed between the closest adjacent points of the tables.

Turntable 12 is driven clockwise by a geared motor 30 (FIG. 1) which is clutched to turntable 12 by a conventional geared clutch assembly 32. Similarly, turntable 14 is driven counterclockwise by a geared motor 34 which is clutched to the turntable by a geared clutch assembly 36. Motors 30 and 34 are preferably driven syncrhonously in the same direction at the same RPM and preferably mesh with clutches 32 and 36, respectively, at identical distances from the axes of shafts 24 and 26, respectively. Thus, turntables may be rotated synchronously at the same rotational speed.

Plant 10 further includes an additional pair of turntables 38 and 40 which are substantially identical to each other. Turntable 38 is rotatably mounted about shaft 24 at the upper end thereof and is driven synchronously with turntable 12 by a motor 39 maintained in synchronism with motor 30 by a conventional synchronizing servo or the like (not shown). Similarly, turntable 40 is rotatably mounted about shaft 26 at the upper end thereof and is driven by a motor 39' for synchronous rotation with lower turntable 14. Preferably, turntables 38 and 40 are equal in diameter to turntables 12 and 14. Such arrangement is not critical, however. All that is required is that a space exist between turntables 38 and 40 so they may rotate freely of one another.

For purposes of explanation, turntables 12 and 38 shall be hereinafter referred to as the "lower" and "upper" turntables, respectively, on a "left" shaft (shaft 24) and turntables 14 and 40 shall be referred to as the "lower" and "upper" turntables, respectively, on a "right" shaft (shaft 26).

Figure 1:
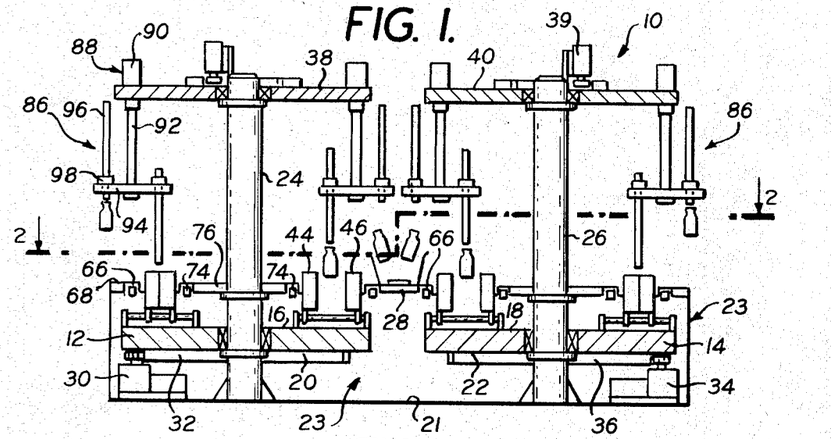
FIG. 1 is a diagrammatic view, partly in section, of an apparatus for mass producing hollow objects according to this invention.
Figure 2:
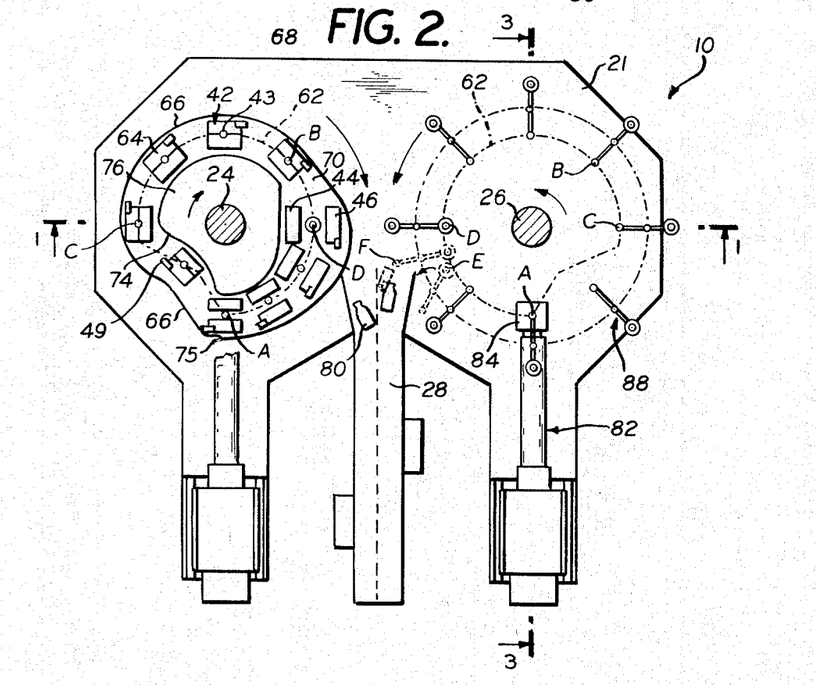
FIG. 2 is a sectional view taken along line 2—2 of FIG. 1 with the molds and cam member deleted from the right half of the apparatus for purposes of illustration.
Figure 3:
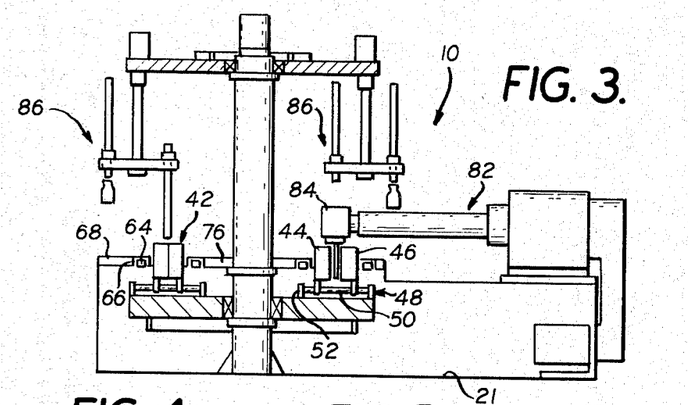
FIG. 3 is a sectional view of the apparatus of FIGS. 1 and 2 taken along line 3—3 of FIG. 2.
Figure 4:
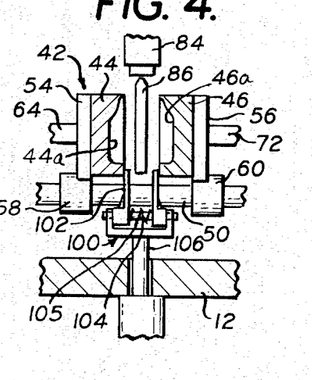
FIG. 4 is an enlarged sectional view of a portion of the apparatus of FIGS. 1–3 showing one stage of operation thereof.

As best shown in FIGS. 1, 3 and 4, each of turntables 12 and 14 includes a plurality of molds 42 mounted at spaced locations thereabout, each mold having an inner half 44 and an outer half 46. Each outer mold half 46 includes a conventional hollow blowing needle 49 (FIG. 2) extending through a front wall thereof. Needle 49 is used in the blowing process in a manner more fully described below.

Each mold half 44 and 46 includes concavity 44a and 46a, respectively, on the inner surface thereof, which concavities cooperate to form a molding chamber 47 (FIG. 5) in each mold when the mold halves of such mold are joined, or closed. Further, when the mold halves are joined, an opening 43 is defined into chamber 47 through the top of the mold.

As best shown in FIG. 3, the halves of each mold are slidably mounted on a conventional mold guide assembly 48 which is itself mounted directly to the associated lower turntable. Each guide assembly 48 includes a pair of elongate bars 50 (only one being shown for purposes of illustration) mounted in parallel relation between a pair of brackets 52 which are mounted on an associated lower turntable with the bars 50 of each assembly being disposed substantially radially of the turntable center. Referring now more particularly to FIG. 4, halves 44 and 46 of each mold each have a jacket 54 and 56, respectively, in the form of an elongate plate affixed to the side of the mold half. Each jacket 54 and 56 includes a lower guide flange 58 and 60, respectively. Each guide flange has spaced holes (not shown) through which bars 50 of an associated assembly 48 pass. Thus, the mold halves of each mold 42 are slidable relative to each other along the bars 50 of the guide assembly 48 to which they are mounted.

As lower turntables 12 and 14 are synchronously rotated, halves 44 and 46 of each mold 42 are designed to follow a preprogrammed path which, at selected points, or stations, along said path, effect an opening or closing of the mold. More specifically, as the lower turntables are rotated, the relative distance between the two halves of each mold are varied according to a predetermined program.

In one particular program found especially useful for this invention, the molds on each lower turntable are each made to follow a path 62 represented by a dotted line in FIG. 2. Each path 62 is defined by the locus of points intermediate halves 44 and 46 of each mold as the latter is moved by the respective lower turntable. In actuality, it will be realized that each mold half follows a separate path from the other mold half so that, as the turntable is rotated, the halves are forced together and apart at certain locations, or stations, along the path of travel of the respective lower turntable. As shown in FIG. 2, each path 62 defines a circle of predetermined radius over a major portion thereof defined between a station C and a station A in the direction of rotation of each lower turntable. Between stations A and C in such direction of rotation however, it will be seen that each path 62 deviates inwardly toward the center of the turntable until a point substantially intermediate stations A and C and then curves outwardly again to reassume said circular path at station C.

Specifically referring to FIGS. 1-3, the apparatus for performing the above referenced program shall now be described. Each mold outer half 46 includes a conventional roller assembly 64 mounted to jacket 54 thereof. Roller assembly 64 is designed to be moved within a complementary track 66 defined in a top cover 68 of frame 23 along the periphery of an opening 70 formed therethrough (see FIG. 1). The configuration of opening 70, and thus track 66, therefore determine the movements of each mold outer half along rods 50 of the guide assembly 48 to which it is mounted as the associated lower turntable is rotated.

Similarly, each mold inner half 44 includes a conventional roller assembly 72 which is preferably identical to roller assembly 64 and is designed to be moved within a complementary closed track 74 defined at the peripheral edge of one of two cams 76 (FIG. 1) rotatably mounted about the shafts 24 and 26 and fixed in position relative to frame 21 by a conventional mounting assembly (not shown). Therefore, the configuration of cam 76, and thus track 74, determine the movement of each mold inner half along rods 50 of the guide assembly to which it is mounted as the associated turntable is rotated.

The precise shape of openings 70 and cams 74 may vary from that specifically shown in FIG. 2. What is important, however, is that mold halves 44 and 46 of each mold be closed at a first station along path 62 and be opened at a second station along said path. In plant 10, such first station is indicated at point A and the second station at point B (see FIG. 2).

In actuality, each mold is closed almost immediately upon leaving station A and is opened almost immediately after leaving station B. The mold is caused to close when passing station A by a hump 75 on track 72 which forces outer mold half 46 toward inner mold half 44. Further, the mold is opened when passing station B due to the divergence of tracks 66 and 74 from one another. Such divergence increases until a station D along path 62. Then, from station D to station A, the tracks converge again to a point at station A wherein the mold halves of the mold are maintained slightly apart for receipt of a plastic extrusion 86 therebetween in a manner more fully described below.

As best shown in FIGS. 2-4, plant 10 further includes a pair of conventional plastic extruder assemblies 82 respectively associated with the pair of lower turntables 12 and 14 (only one full extruder assembly is shown in FIGS. 2 and 3 for purposes of illustration). The extruders are each preferably located on the same side of an ideal plane passing through the axes of both turntables 12 and 14. Such arrangement has been found to reduce the space requirements for plant 10. Each extruder head 84 is positioned directly above an associated lower turntable with its outlet opening (not shown) in vertical alignment with station A along path 62 (see FIG. 2). Head 84 must be at a distance from the associated lower turntable no less than, and preferably slightly greater than the distance of the upper surfaces of mold halves 44 and 46 from such lower turntable to insure clearance of the molds under heads as the lower turntables are rotated.

With reference to FIGS. 1-3, each of upper turntables 38 and 40 of plant 10 includes a plurality of bottle blowing and removal assemblies 86. The number of assemblies 86 on each upper turntable is at least equal to the maximum number of molds that may be carried on the underlying lower turntable. Preferably, there are eight molds on each lower turntable and eight assemblies 86 on each vertically aligned upper turntable.

Referring now specifically to FIG. 1, each assembly 86 preferably includes a shaft 92 rotatably mounted on an associated upper turntable and having an upper end therein connected to a conventional motor 90 mounted to the upper surface of said upper turntable. Each assembly 86 further includes a circular disc 94 which is fixed to the lower end of shaft 92 and is concentric therewith. Each disc 94 includes a plurality of hollow gas transmission tubes 96, such as two, for example, which are slidably mounted through a corresponding plurality of holes (not shown) spaced uniformly about the circumference of the disc. The movement of each tube 96 along its axis is preferably controlled by an associated conventional ram (not shown) to which an upper end of the tube is connected. Preferably, each tube 96 includes a first aperture therein near the upper end of the tube through which a compressed gas may be directed and a second aperture near the lower end of the tube (not shown) for the exhalation of gas therefrom. Both such apertures are deleted for purposes of simplicity. A lower end of each tube 96 is open.

It is important, in accordance with this invention, that discs 94 of removal assemblies 86 be of sufficient diameter so that tubes 96 thereon may be successively positioned in vertical alignment with an associated mold 42 on the respective turntable at a point thereon along the circular segment of path 62. Then, and in accordance with the invention, each tube 96 of each removal assembly 86 may be used both to blow a plastic extrusion captured in an associated mold 42 into the bottle form of the mold and to remove a blown bottle from the associated mold. The precise operation of removal assemblies 86 will be described in more detail below.

Figure 5:
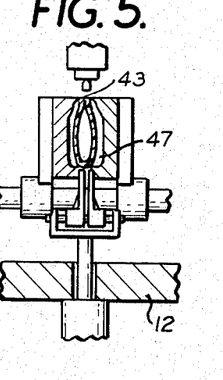
FIG. 5 is a view similar to FIG. 4, but showing the apparatus in another stage of operation.
Figure 6:
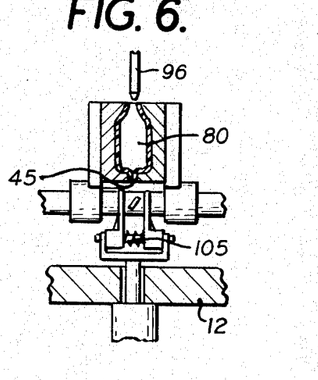
FIG. 6 is a view similar to FIGS. 4 and 5, but showing the apparatus in yet another stage of operation.
Figure 7:
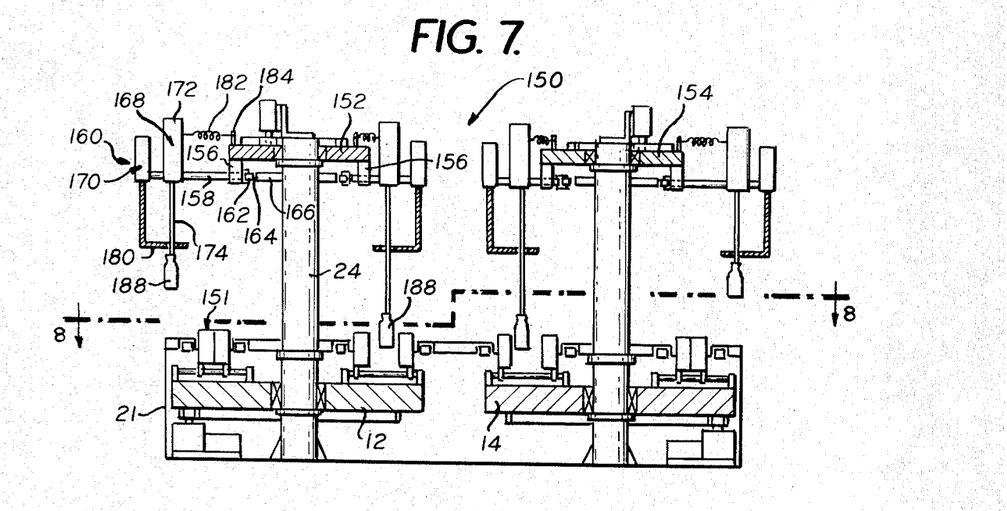
FIG. 7 is a sectional view of another apparatus for mass producing hollow bodies according to this invention.

As shown in FIGS. 4-6, each lower turntable (only a portion of lower turntable 12 being illustrated for purposes of example) preferably contains a plurality of extrusion clipping assemblies 100 thereon equal in number to and respectively associated with the molds on each lower turntable. Each clipping assembly includes a pair of jaws 102 which are slidably mounted on a bar 104 and are biased apart by compression spring 105 (FIGS. 4 and 6). The jaws are supported above the associated lower turntable by a ram assembly 106 to which bar 104 is attached. Ram assembly 106 is mounted on the turntable in a conventional manner so as to follow the associated mold about path 62. Ram assembly 106 normally maintains jaws 102 at a position beneath mold halves 44 and 46 (FIG. 6).

When a plastic extrusion 86 is captured between mold halves 44 and 46 of each mold 42, ram assembly 106 is raised until jaws 102 are between the mold halves at a position beneath concavities 44a and 46a forming molding chamber 47. Then, when the mold halves are joined together the walls of said mold halves force jaws 102 together overcoming the bias of spring 105. After a bottle 80 has been finally blown in the mold (in a manner described below) the ram assembly is lowered thereby causing the excess plastic at the bottom of bottle 80 to be severed (see FIG. 6). Retraction of jaws 102 leaves an opening 45 at the bottom of the mold which permits convective cooling of the bottle.

The operation of plant 10 shall now be described with initial reference to FIGS. 2–4. When a particular mold 42 reaches station A along path 62, the mold halves 44 and 46 thereof are maintained apart a sufficient distance to enable receipt therebetween of a heated plastic extrusion 86 ejected from head 84. Further, ram assembly 106 of the particular clipping assembly 100 is raised at station A to interpose jaws 102 between mold halves 44 and 46 in the manner above described. As soon as a mold passes station A, roller 72 of mold outer half 46 engages hump 75 thereby forcing the outer half toward mold inner half 44 to close the mold. The introduction of the extrusion and the closing of the mold are timed to trap the extrusion in chamber 47. Also, and as stated above, jaws 102 of assembly 100 will also be drawn together when the mold halves are joined (FIG. 5).

Since tracks 66 and 74 are both curved inwardly toward the center of the associated lower turntable just past station A, a mold 42 leaving station A will not only be forced closed, but also will leave the normal circular portion of path 62 and travel a radially inward course. This eliminates any possible disturbance with a new extrusion 86 being ejected from head 84 to be captured by the mold. It will be noted that tracks 66 and 74 curve radially outwardly again to reassume the normal circular path at station C. During the progression of a mold between stations A and C, it will be noted that the spatial relation between tracks 66 and 74 is maintained constant so that the mold is kept closed. In fact, the mold is not again opened until passing station B.

As the mold is moved between stations A and C, it enters a preliminary blowing stage (FIG. 5) whereby the plastic extrusion in the mold is partially blown by forcing a gas pressurized to a low pressure into the mold chamber through needle 49. Such preliminary blowing is a well known procedure undertaken to insure a better distribution of the plastic in chamber 47 before the final blowing process, described below.

The blowing and removal assembly 88 associated with each mold tracks such mold as it is rotated on an associated lower turntable about the associated shaft. The tracking relationship of assemblies 88 relative to molds 42 is clearly shown in FIG. 2 wherein the view of turntable 12 shows the positions of molds 42 thereon and the view of turntable 14 (rotating oppositely of turntable 12) shows the positions of assemblies 88. As a mold 42 is moved from station A to C, the associated blowing and removal assembly 88 will track such mold between such stations along a segment of path 89, which path is preferably completely circular. Disc 94 of assembly 88 is rotatably positioned about shaft 92 such that when the associated mold reaches station C, a particular tube 96 will be vertically aligned with opening 43 of the mold (FIG. 6) and will then be dropped down until its lower end (not shown) passes through opening 43 into chamber 47.

This is immediately followed by forcing a gas, such as air, pressurized to a high pressure through tube 96 into the mold chamber and thus into the heart of the plastic. This causes the plastic to hollow out and assume the bottle shape of the mold. The second aperture of each tube 96 (not shown but above referred to) allows air blown into the mold to be constantly renewed thereby hastening the cooling process as the mold travels from station C to station B. At a point before arriving at station B, ram assembly 106 is lowered thereby severing excess plastic from the formed bottle. Immediately upon passing station B, the mold is caused to open by the divergence of tracks 66 and 74. As stated above, the mold will progressively open wider and wider until it reaches station D along path 62.

When a mold is at station D, its halves 44 and 46 are at a maximum distance apart thereby permitting bottle 80 to be lifted off the turntable between such mold halves by an upward movement of tube 96. Tube 96 will hold onto the bottle due to frictional forces between the bottle mouth and the lower end of the tube.

In accordance with this invention, the arrival of a mold at station D corresponds to a point in time during the cooling process of a bottle 80 blown in such mold wherein the temperature of the bottle is sufficiently cool to maintain its shape when lifted and held by tube 96, and yet is still higher than a desired final cooling temperature for releasing the bottle. The desired final cooling temperature corresponds to a temperature at which the plastic is substantially not plastically deformable. Thus, when removed from the mold at station D, the plastic bottle is still plastically deformable, but not to the extent that it will change its shape due to normal gravitational forces.

Then, and in accordance with this invention, as the mold progresses along path 62 with the associated assembly 88 tracking it, motor 90 is actuated to rotate disc 94 sufficiently to bring the other tube 96 into vertical alignment with the mold at a point along path 62 before reaching station A. This other tube 96 is in a raised position (FIG. 3) so as not to interfere with extruder head 84 when the mold and assembly 88 once again arrive at station A. Meanwhile, the tube 96 holding the bottle is moved apart from path 62 so that the bottle will track the mold around the path from a position alongside the mold. It will be noted that the cooling cycle of the bottle, now exposed to the ambient environment, is greatly speeded up relative to its cooling rate while in the mold.

At station A, the mold is refilled with a new plastic extrusion from head 84 which is pre-blown between stations A and C, finally blown and cooled between station C and D, and removed at station D by lifting up the other tube 96. Just past station D, at a station F, the first bottle is released onto conveyer 28 before motor 90 again rotates disc 94 to reverse the positions of the two tubes 96.

Figure 9:
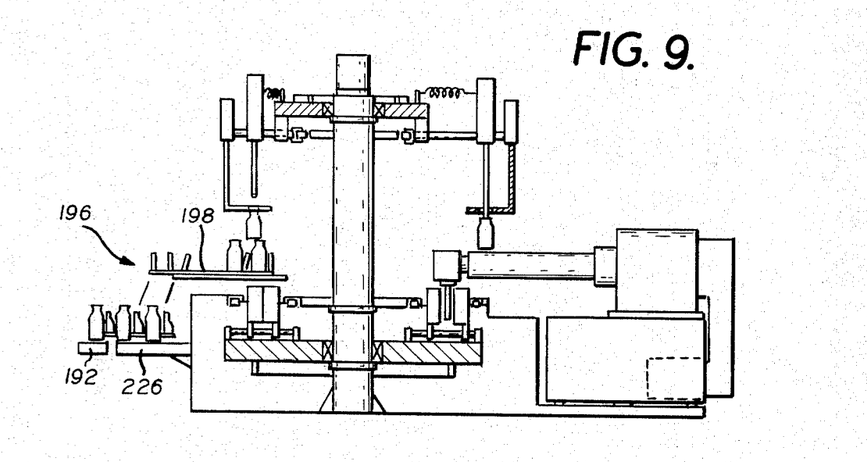
FIG. 9 is a sectional view taken along line 9—9 of FIG. 7.

Depending upon the ambient temperature and humidity, a bottle removed at station D and rotated to a position aside of the mold before reaching station A might cool to a final finishing temperature before completing a full revolution. Preferably, however, a bottle removed at station D is held in tracking relation with the associated mold for slightly more than one revolution, the bottle being released at station F onto conveyer 28. This insures complete final cooling and thus a quality bottle. Any conventional manner of releasing bottles 80 from the tubes 96 holding them may be used, such as, for example, the use of skimmers (see description of FIG. 9, below). A releasing means for plant 10 has been deleted for purposes of simplicity.

In summation, an extrusion is injected into a mold at station A, is pre-blown just after leaving station A, is finally blown at and after station C, is removed from mounted mold as a superheated bottle at station D, and continues to cool by tracking the mold for slightly more than one revolution until reaching station F where it has finally cooled and is released. Meanwhile, the mold is re-injected with a new plastic extrusion upon arriving again at station A which is before the first bottle is released. Thus, a second bottle will be well into the cooling process before the first bottle is finally cooled and released. This is an important aspect of this invention in that the productive output of each mold is greatly increased when considering many hours of operation.

Reference is now had to FIGS. 7–12 wherein another hollow object mass producing plant 150 is shown. As with plant 10, plant 150 is preferably used to mass produce bottles and, most preferably, plastic bottles. Many of the component parts of plant 150 are identical to that of plant 10 and, therefore, shall each bear the identical reference numeral as its counterpart in plant 10. A repeated detail description of such parts will not be given, reference being had to the description thereof in plant 10.

Plant 150 is very similar to plant 10 in that it includes a pair of oppositely rotating lower turntables 12 and 14 onto which a plurality of molds 151 are mouned in spaced relation. Molds 151, although identical in mold chamber design as molds 42, are of a different type, which difference will be described below. However, the path of progression of each mold 151, i.e., path 62, is identical as path 62 of plant 10. The means for controlling the opening and closing of molds 151 is identical in plant 150 as that shown and described in plant 10, i.e., tracks 66 and 74. Further, plant 150 includes a pair of extruder assemblies 82 positioned identically as those in plant 10.

Plant 150 differs from plant 10 in the following respects. First, plant 150 includes a pair of oppositely rotating upper turntables 152 and 154 which, although similar in design and purpose as turntables 38 and 40 of plant 10, are preferably smaller in diameter than the latter turntables and include a plurality of downwardly extending guide members 156. Guide members 156 are preferably located near the periphery of each upper turntable and are spaced identically as molds 151 on the opposing lower turntable 12 or 14. Thus, as turntables 12 and 152 or turntables 14 and 154 are synchronously rotated, guides 156 will track a particular opposing mold 42.

Guides 156 each include a through aperture (not shown) for the slidable accommodation of an arm 158 (FIG. 7) of one of a plurality of associated bottle removing and releasing assemblies 160. One end of each arm 158 includes a roller 162 thereon which is designed to roll along a curved surface 164 defined at the periphery of cam member 166 rotatably supported about shaft 24. Cam member 166 is fixed in position relative to frame 21 so that removal assembly 160 will be moved relative to the cam member as turntable 152 is rotated by shaft 24.

Each assembly 160 includes having a cylinder 172 and a reciprocating piston 174 in the form of a lance. Ram 168 is preferably operated by a source of compressed gas, e.g., air, to raise and lower the lance relative to the underlying lower turntable. Ram 168 is preferably mounted on arm 158 at a location near the outer end (not shown) of the assembly 160.

Each assembly 160 further includes a ram 170 having a cylinder 176 which is mounted to arm 158 at such outer end thereof. Ram 170 also includes a reciprocating piston 178 having a skimmer 180 attached to its lower end. Skimmer 180 is a conventional device which is preferably in the form of a plate having a hole (not shown) threin through which lance 174 of ram 172 may be accommodated in a manner more fully described below. Rm 170 may be operated by a source of compressed gas to raise and lower skimmer 180 relative to lance 174.

Figure 8:
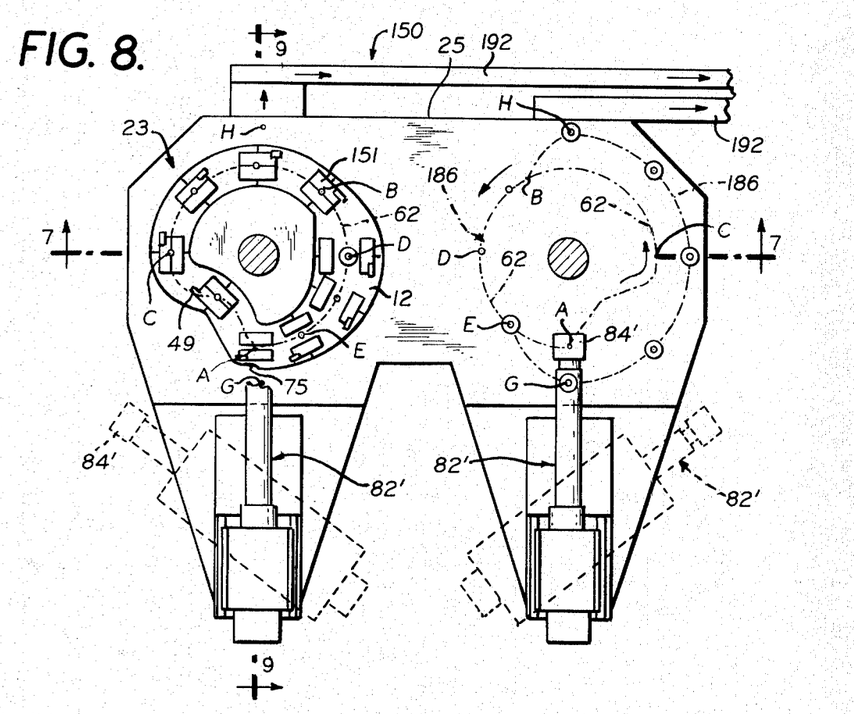
FIG. 8 is a sectional view taken along line 8—8 of FIG. 7 with a portion of a collecting and transporting assembly deleted for purposes of clarity in describing the other portions of such assembly.

Roller 162 on arm 158 is held on contact with surface 164 of cam 166 by means of a tensioned spring 182 connected between cylinder 172 and a bracket 184 upstanding from the upper surface of the associated upper turntable. Cam 166 is preferably of a shape such that the position of each lance 174 will be caused to follow a predetermined path 186 (FIG. 8) as the associated upper turntable is rotated. Referring particularly to FIG. 8, it will be noted that path 186 of each lance 174 overlaps path 62 of molds 151 between a station B and a station E along said paths. Such overlapping represents a vertical alignment between lance 174 and an associated mold 151. After leaving station E, each lance 174 preferably moves radially outwardly until reaching a station G preferably aligned with station A on path 62. From station G to a station H, preferably 180° from station G, path 186 is circular of radius greater than the radius of path 62.

The extent to which the radius of path 186 between stations G and H exceeds the normal radius of path 62 between stations A and C is not critical. It is preferred, however, that each lance 174 be removed sufficiently apart from the associated mold before the mold reaches station A so that the mold may be refilled with plastic unimpeded by the lance. Also, it is preferred that each lance 174 be maintained apart from the mold at a point along the path of the lance wherein a bottle held by the lance is released so that the bottle may be collected apart from the molds. Preferably, the release of such bottles occurs at station H in a manner more fully described below. It is further important that the lance be returned to vertical alignment with the associated mold 151 before the mold reaches station D so that another bottle formed in the mold may be removed by the lance at such station in a manner more completely described below. Preferably, the return of lance 174 to such vertical alignment occurs at station B (FIG. 8).

Plant 150 further differs from plant 10 in that removal assemblies 160 are not used to blow gas into an associated plastic filled mold, as was one function of removal assemblies 86 of plant 10. Assemblies 160 are each used merely to remove a bottle formed in an associated mold, to hold such bottle apart from the mold while moving along its own path 186 tracking the mold along its own path 62 and then to release such bottle at station H in a manner more fully described below.

In plant 150, plastic bottles 188 (FIG. 7) are finally blown in molds 151 by a blowing nozzle (not shown) built into each mold 151 and which is connectable to a source of compressed gas, such as compressed air (not shown). Such molds are well known in the art and are commonly referred to as "blowing molds." Molds 151 further each include a blowing needle 49 identical in purpose and function as that contained in molds 42, i.e., for use in the preliminary blowing stage of the bottles. Additionally, molds 151 also each include a conventional mold cutting knife (not shown) carried therein for removal of excess plastic. Molds containing such knives are conventional. It will be noted that such knives are used in place of assemblies 100 of plant 10 (FIGS. 4—6). It should further be noted that bottles 188 blown in blowing molds 151 have the identical overall shape as bottles 80 blown in mold 42. The only difference is that each bottle 188 has a closed mouth (not shown) since it is blown from within the mold and not by an exterior blowing tube, such as tube 96 of removal assembly 88.

In plant 150, lance 174 serves two functions. First, it may be lowered into a mold to pierce a hole in the closed mouth of a blown bottle to allow gas within the bottle to escape. Second, it may be used to remove a bottle from the associated mold. Both of these functions will be more fully described below.

Another difference between plant 150 and plant 10 is that, unlike extruder assemblies 82 of plant 10 which were fixed in position relative to the support frame of the plant, plant 150 includes a pair of extruder assemblies 82' which are identical in all respects to assemblies 82 except that they are pivotal about an axis parallel to the axis of the lower turntables. More specifically, each extruder assembly 82' may be pivoted to selectively position an extruder head 84' thereof at an extruding station A along path 62 of molds 151. When not in use, it may be pivoted away from said path to another position (see dotted line representation of assemblies 82' in FIG. 8) so as to enable the molds and removal assemblies to be serviced.

The operation of plant 150, insofar as the manufacture of plastic bottles 188 is concerned, will now be described. With reference to FIG. 8, the left lower turntable 12 depicts the opening and closing of molds 151 being rotated on such turntable along path 62, whereas the right lower turntable 14 depicts the movements of lances 174 along path 186 as they track molds 151. Of course, molds 151 follow a similar course on the right turntable as they do on the left, and lances 174 follow a similar path on the left turntable as they do on the right.

Let us follow the progression of a single mold 151 and associated lance 174 starting at extruding station A of mold path 62 and station G of lance path 186. It is assumed, of course, that extruder assemblies have been pivoted into an operating position with their extruder heads at station A. Thus, a mold 151 arriving at station A will capture an extrusion ejected from the associated extruder head and will then move radially inwardly along path 62. At this point, the associated lance 174 is maintained apart from the mold and is in a raised position.

As the mold moves along path 62 between extruding station A and station C, it will be recalled that the mold rapidly closes and moves radially inward and then back out to station C where it reassumes the normal circular segment of path 62. During such progression between stations A and C, the plastic extrusion in the mold is preblown as above described. At station C, the mold is subjected to a final blowing process until reaching station B wherein the associated lance 174, which has been tracking the mold all this time, reenters path 62 and is lowered by ram 168 until its end pierces the bottle mouth thereby forming a degassing hole. The lance is then removed to allow gas to escape and is then reinserted into the bottle. This whole procedure occurs very rapidly before the mold has fully opened at station D.

When the mold reaches station D, the bottle 188 blown therein has cooled sufficiently so that it may be removed from the mold without losing its shape but is still higher in temperature then a desired final cooling temperature. Therefore, lance 174 is raised at station D to raise the bottle out of the mold.

When each mold 151 passes station D along path 62 (FIG. 8) its halves will begin to close and will fully close just past station A wherein a new extrusion will have been captured. Meanwhile, lance 174 is caused to swing outwardly at station E due to the shape of cam 166 to a greater diameter path 186 so as not to interfere with the operation of the extruder assembly. Then, as the mold again moves along path 62, the bottle previously removed therefrom and held by lance 174 will continue to track the mold until reaching station H at which point the skimmer 180 associated with the lance is lowered by its ram 170 to thereby release the bottle onto collecting and transporting assembly 190, as described below. At station H, the bottle will, of course, have cooled down to its final cooling temperature wherein it is no longer substantially plastically deformable. Continued rotation of the turntables then causes the lance to move radially inward past station H due to the shape of cam 166 and bias of the associated spring 182 until again becoming vertically aligned with the associated mold 151 at station B, wherein the lance is thereafter plunged down again into the next bottle formed in mold 151. The entire process is then repeated again and again.

It will be realized that each mold is refilled with extruded plastic during the cooling cycle of the previously blown bottle therein. This, as stated before, greatly increases the maximum operating output of each mold.

Referring to FIGS. 9–12, a collecting and transporting assembly 196 is provided for each lower turntable 12 and 14. As the two assemblies 196 are substantially identical with one another, only the assembly 196 associated with left lower turntable 12 shall be described in detail. Such assembly 196 comprises a conventional endless belt 192 arranged adjacent and parallel to rear wall 25 of frame 23 (see FIG. 8) and thus tangent to the direction of rotation of turntable 12. Belt 192 has its upstream end adjacent station H of the path 186 of rotation of lances 174 and a downstream end at another processing station (not shown), such as a disinfecting station or a bottle top cap cutting station, for example. It will be noted that both conveyor belts 192 are preferably arranged in side by side relation with the belt 192 associated with turntable 14 preferably being closer to frame 21.

Figure 10:
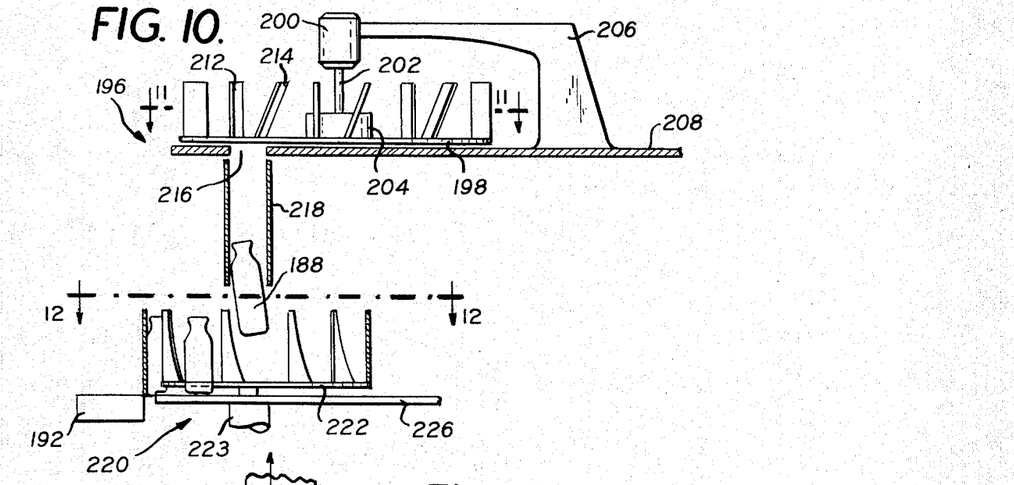
FIG. 10 is an enlarged sectional view of a collecting device of the apparatus of FIGS. 7-9.
Figure 11:
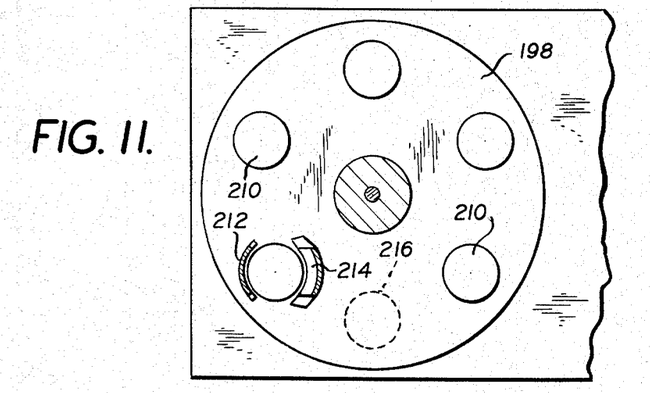
FIG. 11 is a sectional view taken along line 11—11 of FIG. 10.

As best shown in FIGS. 10 and 11, each assembly 196 further comprises a circular turntable 198 which is fixed to a drive shaft 202 of a motor 200 for rotating turntable 198 synchronously with turntables 12 and 14 (FIG. 1). Motor 200 is supported by an arm 206 which is mounted on the upper surface of a stationary plate 208. Plate 208 is mounted on frame 23 by a suitable mounting assembly (not shown). Thus, turntable 198 may be rotated relative to frame 23 and synchronously with turntables 12 and 14.

Turntable 198 includes a plurality of holes 210 (FIG. 11) which are preferably spaced uniformly about the disc along a common circular path. Each hole is preferably of the identical diameter which is greater than the maximum diameter of bottles 188. Turntable 198 further includes a plurality of pairs of bottle guide plates 212 and 214, respectively associated with each hole 210 (only one pair of plates 212 and 214 being shown for purposes of illustration). Plates 212 and 214 of each pair are mounted about a portion of the periphery of the corresponding hole, they preferably being portions of circular cylinders. Desirably, plate 212 of each pair is upstanding and plate 214 is inclined with its outer edge further from the associated hole 210 than its lower edge mounted to disc 198. Each pair of plates 212 and 214 thus form a funnel-shaped intake channel to an associated hole 210.

Stationary plate 208 includes a circular aperture 216 (FIGS. 10 and 11) with its center aligned with the locus of points formed by the centers of holes 210 as disc 198 is rotated. Aperture 216 is slightly greater in diameter than each of holes 210. In accordance with this invention, turntable 198 is positioned relative to the path 186 of travel of lances 174 so that, as turntable 198 is rotated, holes 210 will be brought seriatim into vertical alignment beneath station H of path 186 of bottles 188 (FIG. 8). Aperture 216 of plate 208 is located at a position about the path of holes 210 apart from station H of path 186 so that a bottle 188 released by a lance and dropped onto assembly 196 will not pass simultaneously through a hole 210 and aperture 216.

Figure 12:
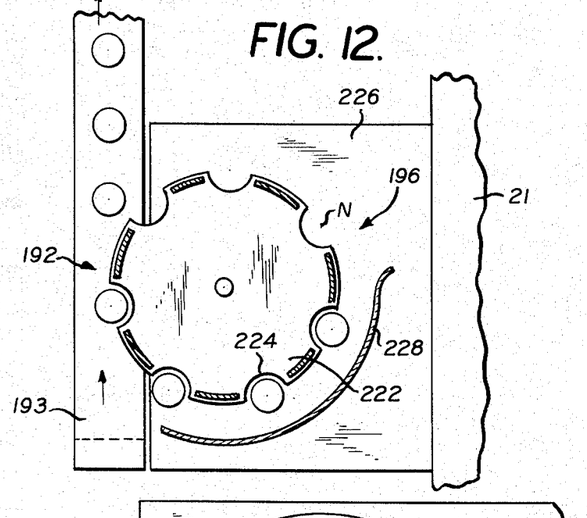
FIG. 12 is a sectional view taken along line 12—12 of FIG. 10.

Assembly 196 further includes a circularly cylindrical chute 218 which is mounted to the underside of plate 208 in surrounding relation with aperture 216, the minimum inner diameter of chute 218 being at least as great as that of aperture 216. The means for mounting chute 218 may include a weld or a separate mounting piece (not shown). Thus, bottles released at station H will fall between guides 212 and 214 of an aligned hole 210 and rest on plate 208 as turntable 198 rotates until the bottle is aligned with aperture 216 wherein the bottle will fall through such aperture and pass along chute 218 to a bottle transfer device 220 (FIGS. 10 and 12).

Bottle transfer device 220 includes a circular turntable 222 which is driven by a motor (not shown) about a shaft 223 to which the turntable is mounted. Turntable 222 has a plurality of semi-circular recesses 224 notched into its peripheral edge at uniformly spaced points, wherein each recess 224 has a radius of curvature at least as great as that of bottles 188 and, preferably, slightly greater. Shaft 223 is rotatably mounted to a plate 226 which is fixed to frame 23 at a location thereon such that the path of travel of recesses 224 as turntable 222 is rotated intersects the longitudinal axis of chute 218 as represented by point N in FIG. 12. Further, turntable 222 overhangs conveyor belt 192 at another point along its path of rotation.

Bottle collecting device 220 further includes an accurate guard rail 228 (FIG. 12) mounted on plate 226 adjacent a segment of the periphery of turntable 222. Rail 228 extends from one end adjacent the drop off point of bottles 188 onto plate 226 (i.e., point N) to another end adjacent the receiving end 193 of the conveyor, turntable 222 being rotatable in a clockwise direction as shown in FIG. 12. The radius of curvature of rail 228 is greater than that of the periphery of turntable 222 by an amount no greater than the diameter of bottles 188 so that the bottles will be maintained in recesses 224 as the turntable is rotated to advance the bottles from drop off point N to the conveyor belt receiving end 192.

In operation, turntables 198 and 222 are rotated synchronously so that bottles dropped through chute 218 land on plate 226 and are nested against an aligned recess 224. The bottle will then be led along a circle defined by the periphery of turntable 222 as the latter is rotated, the bottle being restrained from radially outward movement by rail 228. After passing the end of rail 228 closest conveyor belt 192, the bottle will be led will be led onto such conveyor belt where the latter will transport the bottle to a further processing station (not shown).

Although the invention has been described with reference to two specifically illustrated embodiments, the invention is not to be so limited. Rather, the invention is deemed to include obvious modifications and changes to those embodiments.

For example, the path of progression of each mold in a plant of this invention need not be substantially circular, as defined by the rotation of a turntable to which the mold is affixed. Other paths of progression are also contemplated, such as straight, wherein the molds move back and forth along the straight parallel paths.

As another example, there may be more removal devices associated with each mold than the number shown and described above with reference to plants 10 and 150. For instance, each upper turntable in plant 10 may include more than just two removal devices 88 on each disc 94. The maximum number of such devices is, of course, dependent upon the diameter of disc 94. It is clear, however, that the more removal devices per disc 94, the longer each bottle removed from a mold may be held in tracking relation therewith to insure complete final cooling. For example, three removal devices 88 on each disc 94 would allow each bottle to track the associated mold for more than two complete revolutions of the associated turntable. With respect to plant 150, the number of removal devices 168 may also be increased on each arm 158. Of course, the shape of cam 166 would have to be altered so that the removal devices associated with each mold would remove and release bottles serially.

As another example of an alternative to the illustrated embodiments above described, each mold may have a plurality of mold chambers defined therein arranged along a common radial path from the center of the associated lower turntable. Accordingly, an extruder head would be provided having a plurality of nozzles in a row with each nozzle aligned with the path of travel of a distinct mold chamber. Such molds and extruder heads are well known in the art and thus will not be further discussed herein. In accordance with such a system, it would, of course, be necessary to have a plurality of removal devices alignable with the chambers of a particular mold at each removal device position on either discs 94 (plant 10) or ams 158 (plant 150). Thus, a set of bottles would be simultaneously removed from each mold and then simultaneously moved apart from the mold to track the latter along a segment of its path of travel.

As another example, it is not essential for a bottle producing plant of this invention to employ a pair of oppositely rotating turntable systems. For instance, shafts 24 and 26 of plants 10 or 150 may be driven in the same direction. Also, this invention contemplates a plant having only one rotating turntable assembly such as turntables 12 and 38 of plant 10.

As a further example, plants 10 or 150 may utilize an auxiliary device to hasten the closing of each mold leaving extruding station A. For instance, the outer mold half 46 of each mold may be disengaged from track 72 at station A and then be mechanically pushed toward the inner mold half. This may be accomplished by an air operated ram having a plate connected to its posiston for engaging a segment of the mold outer half to push it toward the mold inner half when the piston is extended. As the closed mold leaves station A, the outer mold half may then be reengaged with track 72. Track 72 would, of course, have to be modified to accomplish the above result.

It is not essential, in plant 150, for lances 174 to be moved apart from the associated molds 151 at station E, although such is preferred when a collecting and transporting assembly 196 is employed. For example, it is possible just to maintain lance 174, and any bottle carried thereby, aligned with the associated mold between stations E and H (both stations being now on path 62) as long as it is high enough to clear the extruder at station A. Of course, an assembly would have to be provided between the lances and molds for collecting released bottles and transferring them to a conveyor belt or the like.

Figure 13:
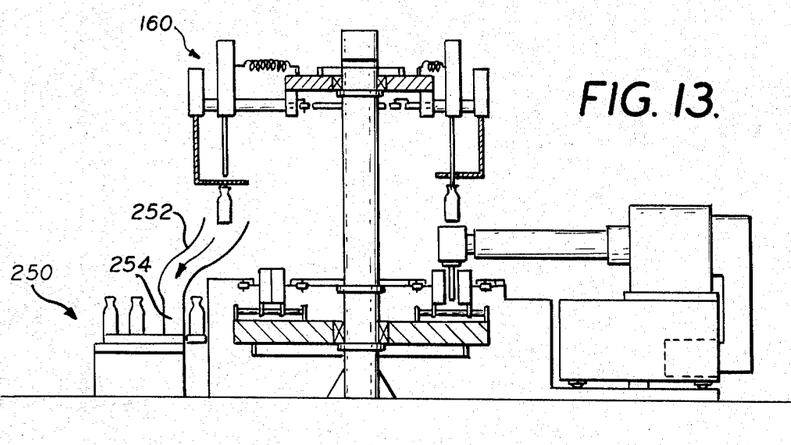
FIG. 13 is a sectional view of an apparatus similar to the apparatus of FIG. 9 and shown with another collecting device of this invention.
Figure 14:
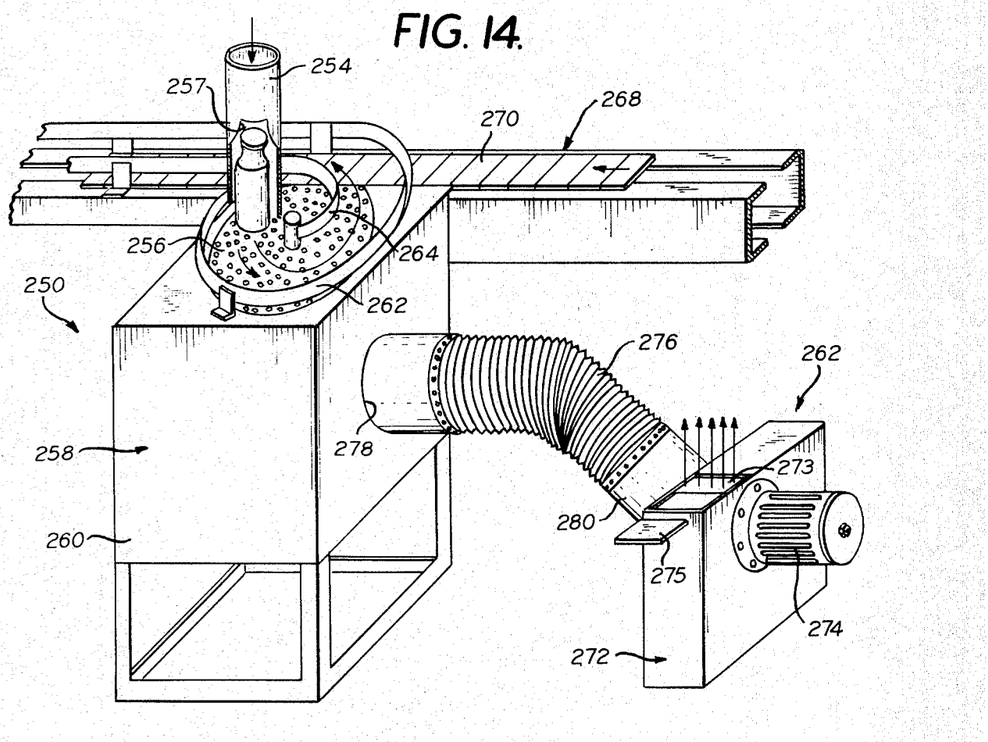
FIG. 14 is a perspective view of the collecting device of FIG. 13.

The specific bottle collecting and transporting assembly 196 shown in plant 150 is not required in this invention. Any such assembly for accomplishing the same result may be employed. For example, another bottle collecting and transporting device 250 is shown in FIGS. 13 and 14. Bottle collecting device 250, although preferred for use in a bottle producing plant of this invention, is not confined to use with such plants. Rather, collecting device 250 may be used in any bottle manufacturing plant where bottles are released to drop vertically downward. Further, a pair of devices 250 may be used in plants having two oppositely rotating systems, such as in plants 10 and 150. In describing collecting device 250, it is assumed, for purposes of example, that the device is used to collect bottles 188 released from removal devices 168 of plant 150.

Referring now specifically to FIGS. 13 and 14, collecting device 250 includes a hopper shaped tube 252 (shown only in FIG. 13) which has an upper end in underlying vertical alignment with the releasing point of bottles 188 from lances 174. The upper end of tube 252 is preferably circular and preferably has a diameter substantially larger than that of bottles 188. The lower end of tube 252 is attached to a vertical cylinder 254 which is held in an upright position slightly above a rotatable porous disc 256 of a bottle handling assembly 258. Cylinder 254 is positioned eccentric to the axis of rotation of disc 256, which disc is preferably rotated in a counter-clockwise direction.

Cylinder 254 has a side opening 257 which faces in the direction of rotation of disc 256. Opening 257 is larger than the maximum diameter of bottles 188 and is preferably of substantially the same shape. Thus, a bottle released by plant 150 is directed through hopper 252 to tube 254 where it lands on disc 256. As disc 256 is rotated counter-clockwise, each bottle 188 will leave tube 254 through opening 257 where it will then follow a rotary path about the axis of the disc.

Disc 256 is rotated by a motor (not shown) which is disposed within a housing 260 of bottle handling assembly 258. The interior of housing 260 is kept under a partial vacuum by a vacuum control assembly 262 to be described below. Since disc 256 is porous, the lower air pressure within housing 260 provides a suction force through the pores of disc 256 which maintains bottles 188 on the disc in an upright and fixed position as the disc is rotated.

Bottle handling assembly 258 further includes a pair of guide rails 262 and 264 which guide a bottle along its rotary path on disc 256 from tube 254 to a conventional conveyor assembly 268 forming a part of assembly 258. Conveyor assembly 268 preferably comprises an endless chain of linked plates 270 which advance along a path tangent to the path of rotation of disc 256. Guide rail 262 extends in a substantially circular path from the side wall of tube 254 at a location near opening 257, widens out to cross plates 170 and then straightens out on the right side of the conveyor and extends the length of the conveyor in the director of its path of progression. Guide 264, on the other hand, extends substantially circularly from the center of disc 256 to the left side of the conveyor where it then straightens out and extends the length of the conveyor. Thus, a bottle 188 moving along a rotary path on disc 256 will be guided onto conveyor 268 and will be maintained and guided thereon as it progresses along the path of the conveyor.

Vacuum assembly 262 is comprised of an exhaust fan 272 which is operated by a motor 274. Fan 272 is connected to housing 260 by means of an air hose 276 coupled between an air outlet opening 278 of housing 260 and a riser 280 of the fan. The housing of fan 272 is provided with an opening 273 which may be opened or closed by means of a sliding cover plate 275. Depending upon how large opening 283 is made, the delivery capacity of the fan may be adjusted as well as the partial vacuum in housing 160.

Other obvious modifications and changes to the above described embodiments are contemplated in this invention, the scope of which is to be defined by the following claims.

What is claimed is:

1. Apparatus for mass producing hollow bottles fabricated of a material which is plastically deformable at an elevated forming temperature and substantially plastically non-deformable at a lower cooling temperature, the apparatus comprising:

a. a frame member;
   b. A pair of oppositely and synchronously rotatable turntables rotatably mounted on said frame member;
   c. A plurality of molds mounted in spaced relation along a common circumferential path on each turntable, each mold bieng comprised of two halves which are mounted are controlled movement relative to each other and the turntable substantially radially from the axis of the turntable as the turntable is rotated;
   d. means for controlling the relative radial movement of the mold halves of each mold as the associated turntable is rotated whereby the molds are caused to follow a predetermined path of travel and are caused to open and close at various stations along said path of travel;

e. extruder means associated with each turntable for ejecting material at not lower than said forming temperature into said path of the molds at a first station along said path, each mold arriving at said first station in an opened state to receive an extrusion of material between its halves and then immediately being closed by said controlling means to capture said extrusion therein;

f. means associated with each mold for blowing the material in each mold into the bottle form of the mold;

g. means associated with each mold for removing a bottle formed in the mold at a second station along said path wherein the bottle has cooled sufficiently to maintain its shape and yet is still warmer than said lower cooling temperature, the mold arriving at said second station in an opened state;

h. means for causing each removing means to track the mold associated therewith for at least a portion of said path of travel of the mold past said first station after a bottle is removed from the mold at said second station whereby said bottle is further cooled to its lower cooling temperature as it tracks said mold, without being subjected to a deforming stress;

i. said extruder means reinjecting said mold with material at said first station whereby a second bottle will be in the process of formation before the first bottle formed therein has finally cooled; and j. means for releasing each bottle after it has cooled to its lower cooling temperature.

2. The apparatus of claim 1, further comprising a conveyer assembly for collecting bottles released from the removing means associated with both turntables and for transporting said bottles to a remote location, a bottle receiving end of said conveyor assembly being located between the adjacent most points of said two turntables, the bottles all being released onto the conveyor assembly at such bottle receiving end.

3. The apparatus of claim 1, further comprising:

a. a conveyor assembly associated with each turntable for transporting bottles positioned thereon to a remote location; and b. a bottle collecting assembly associated with each turntable for collecting bottles released from the removing means associated with each turntable and for transferring said bottles onto the associated conveyor assembly.

4. The apparatus of claim 3, wherein the conveyer assemblies and bottle collecting assemblies are all located on a common side of an ideal plane passing through the axes of the two turntables and wherein the extruder assemblies are both located on the opposite side of said ideal plane.

5. The apparatus of claim 4, wherein each extruder assembly includes an extruder head normally positioned in vertically overhead alignment with the path of travel of the molds on an associated turntable, each extruder assembly being pivotal about an axis apart from said head and parallel to the axis of rotation of the asssociated turntable.

6. The apparatus of claim 1, wherein:

a. each mold, when closed, has an interior chamber in which a bottle may be blown and an opening in the top of the mold communicating into said chamber; and b. the means for blowing the material in each mold into a bottle form and the means for removing a bottle from a mold simultaneously comprise a gas transmission tube connectable to a source of pressurized gas and having a lower open end for insertion through said opening in the top of a closed mold into the interior of said mold, the tube being insertable into an associated closed mold to blow the material therein into the form of a bottle.

7. The apparatus of claim 6, further comprising:

a. means associated with each tube for controlling the vertical position thereof relative to the associated mold so that when the mold is opened the tube is raised to remove the bottle from between the mold halves; and b. means for controlling the position of each tube laterally of the path of travel of the associated mold so that said tube is moved into and out of vertical alignment with said path at predetermined locations along the path of travel of the tube as the latter tracks the associated mold.

8. The apparatus of claim 7, wherein said last mentioned controlling means causes the tube to move out of vertical alignment with the path of the associated mold after a bottle is removed therefrom and to move back into vertical alignment with said path after said removed bottle is released from the tube.

9. The apparatus of claim 8, wherein each mold has at least two gas transmission tubes associated therewith, each tube associated with a particular mold being sequentially moved into vertical alignment with said particular mold by said means for controlling the position of each tube laterally of the path of travel of the molds to thereby blow and remove a different bottle from said particular mold.

10. The apparatus of claim 1, wherein the means for controlling the relative radial movement of the mold halves of each mold causes the mold halves of each mold to close and move relatively rapidly radially inwardly when leaving said first station, whereby an extrusion is captured in said mold and said mold is removed rapidly from the vicinity of the extruder assembly so as not to interfere with the next following mold.

11. The apparatus of claim 1, wherein:

a. each mold when closed has an interior chamber in which a bottle may be blown and an opening in the top thereof communicating into said chamber;

b. the means for blowing the material in each mold into a bottle form includes blowing means provided in each mold; and c. the bottle removing means associated with each mold comprises a lance having a substantially pointed lower end for insertion through said opening in the top of a closed mold to pierce a ready blown bottle therein, and means associated with each lane for controlling the vertical position thereof, whereby a lance vertically aligned with a closed mold may be lowered to pierce a hole in the ready blown bottle and then raised to release the gas therein and then relowered and, after the mold has been opened, raised again to remove the bottle from between the mold halves.

12. The apparatus of claim 11, further comprising means for controlling the position of each lance laterally of the path of travel of the associated mold to move the lance out of vertical alignment with said path after a bottle is removed therefrom and to move the lance back into vertical alignment with said path after the bottle is released from the lance.

* * * * *